(12) United States Patent
Raskar et al.

(10) Patent No.: US 12,422,173 B2
(45) Date of Patent: Sep. 23, 2025

(54) MULTIPLE-COMPRESSOR SYSTEM WITH OIL BALANCE CONTROL

(71) Applicant: Copeland LP, Sidney, OH (US)

(72) Inventors: Prashant Rangnath Raskar, Ahmednagar (IN); Sunil A. Magadum, Pune (IN); Douglas Patrick Pelsor, Plain City, OH (US); Pradeep Chiral, Ahmednagar (IN); Pavan Pralhad Jorwekar, Ahmednagar (IN)

(73) Assignee: Copeland LP, Sidney, OH (US)

( * ) Notice: Subject to any disclaimer, the term of this patent is extended or adjusted under 35 U.S.C. 154(b) by 218 days.

(21) Appl. No.: 18/201,511

(22) Filed: May 24, 2023

(65) Prior Publication Data

US 2024/0060691 A1 Feb. 22, 2024

(30) Foreign Application Priority Data

Aug. 19, 2022 (IN) .............................. 202221047293

(51) Int. Cl.
*F25B 31/00* (2006.01)
*F16N 29/02* (2006.01)
(Continued)

(52) U.S. Cl.
CPC ............ *F25B 31/002* (2013.01); *F16N 29/02* (2013.01); *F25B 1/10* (2013.01); *F25B 41/20* (2021.01);
(Continued)

(58) Field of Classification Search
CPC ........ F25B 31/002; F25B 31/004; F25B 1/10; F25B 41/20; F25B 2500/16; F16N 29/02;
(Continued)

(56) References Cited

U.S. PATENT DOCUMENTS 3,542,338 A 11/1970 Scaramucci
3,763,659 A 10/1973 Hover
(Continued)

FOREIGN PATENT DOCUMENTS

CN 1333450 A 1/2002
CN 203161535 U 8/2013
(Continued)

OTHER PUBLICATIONS

Search Report regarding European Patent Application No. 17160627.0, dated Aug. 9, 2017.
(Continued)

*Primary Examiner* — Miguel A Diaz
(74) *Attorney, Agent, or Firm* — Harness, Dickey & Pierce, P.L.C.

(57) ABSTRACT

A climate-control system may include first and second compressors and a suction manifold. The first compressor includes a first shell, a first compression mechanism, and a first suction inlet through which working fluid is drawn into the first compressor. The second compressor includes a second shell, a second compression mechanism, and a second suction inlet through which working fluid is drawn into the second compressor. The suction manifold includes first and second arms. The first arm provides working fluid to the first suction inlet. The second arm provides working fluid to the second suction inlet. The second arm includes a first suction pipe, a second suction pipe, and a suction valve. The suction valve is movable between a first position in which working fluid is allowed to flow through the first suction pipe and a second position in which working fluid is allowed to flow through the second suction pipe.

20 Claims, 8 Drawing Sheets

(51) Int. Cl.
*F25B 1/10* (2006.01)
*F25B 41/20* (2021.01)

(52) U.S. Cl.
CPC ...... *F16N 2210/16* (2013.01); *F16N 2250/18* (2013.01); *F16N 2270/10* (2013.01); *F25B 2500/16* (2013.01)

(58) Field of Classification Search
CPC ............. F16N 2210/16; F16N 2250/18; F16N 2270/10
See application file for complete search history.

(56) References Cited

U.S. PATENT DOCUMENTS

| | | | |
|---|---|---|---|
| 3,777,509 | A | 12/1973 | Muench |
| 4,179,248 | A | 12/1979 | Shaw |
| 4,383,802 | A | 5/1983 | Gianni et al. |
| 4,418,548 | A | 12/1983 | Sawyer |
| 4,589,263 | A | 5/1986 | DiCarlo et al. |
| 4,750,337 | A | 6/1988 | Glamm |
| 4,979,885 | A | 12/1990 | Yasuda et al. |
| 5,329,788 | A | 7/1994 | Caillat et al. |
| 5,385,453 | A | 1/1995 | Fogt et al. |
| 5,584,949 | A | 12/1996 | Ingram |
| 5,842,354 | A | 12/1998 | Kawasumi et al. |
| 5,988,223 | A | 11/1999 | Kanzaki et al. |
| 5,996,363 | A | 12/1999 | Kurachi et al. |
| 5,996,364 | A | 12/1999 | Lifson et al. |
| 6,206,652 | B1 | 3/2001 | Caillat |
| 6,213,731 | B1 | 4/2001 | Doepker et al. |
| 6,273,427 | B1 | 8/2001 | Simmons et al. |
| 6,428,296 | B1 | 8/2002 | Elson et al. |
| 6,461,120 | B2 | 10/2002 | Harakawa et al. |
| 6,474,087 | B1 | 11/2002 | Lifson |
| 6,679,072 | B2 | 1/2004 | Pham et al. |
| 6,823,686 | B2 | 11/2004 | Chumley et al. |
| 7,007,503 | B2 | 3/2006 | Takashi |
| 7,222,491 | B2 | 5/2007 | Moriwaki |
| RE42,966 | E | 11/2011 | Lifson et al. |
| 8,312,731 | B2 | 11/2012 | Tomioka et al. |
| 8,398,387 | B2 | 3/2013 | Shiotani et al. |
| 8,459,053 | B2 | 6/2013 | Pham et al. |
| 8,485,789 | B2 | 7/2013 | Gu et al. |
| 8,585,382 | B2 | 11/2013 | Akei et al. |
| 8,616,014 | B2 | 12/2013 | Stover et al. |
| 9,146,046 | B2 * | 9/2015 | Chae ........................ F25B 41/20 |
| 9,273,678 | B2 | 3/2016 | Bonnefoi et al. |
| 9,360,011 | B2 | 6/2016 | Perevozchikov et al. |
| 9,470,230 | B2 | 10/2016 | Koyama et al. |
| 9,551,351 | B2 | 1/2017 | De Bernardi et al. |
| 9,920,965 | B2 | 3/2018 | Joo et al. |
| 10,012,419 | B2 | 7/2018 | Jeong et al. |
| 10,081,226 | B2 | 9/2018 | Connell et al. |
| 10,641,268 | B2 | 5/2020 | Brostrom et al. |
| 10,941,772 | B2 | 3/2021 | Schaefer et al. |
| 11,415,342 | B2 | 8/2022 | Ohnishi et al. |
| 11,421,681 | B2 | 8/2022 | Raskar et al. |
| 11,435,121 | B2 | 9/2022 | Ishiguro |
| 2005/0063849 | A1 | 3/2005 | Cho et al. |
| 2005/0244286 | A1 | 11/2005 | Palma et al. |
| 2007/0033965 | A1 | 2/2007 | Lifson et al. |
| 2010/0186433 | A1 | 7/2010 | Galante et al. |
| 2010/0202909 | A1 | 8/2010 | Shiotani et al. |
| 2010/0206000 | A1 | 8/2010 | Jeong et al. |
| 2011/0138831 | A1 | 6/2011 | Ogata et al. |
| 2013/0177404 | A1 | 7/2013 | Bernardi et al. |
| 2013/0255309 | A1 | 10/2013 | Wu et al. |
| 2013/0298594 | A1 | 11/2013 | Bonnefoi et al. |
| 2013/0330210 | A1 | 12/2013 | Bonnefoi et al. |
| 2014/0037484 | A1 | 2/2014 | Fraser et al. |
| 2014/0241926 | A1 | 8/2014 | Fraser |
| 2014/0345307 | A1 | 11/2014 | Bagley et al. |
| 2017/0176074 | A1 | 6/2017 | Crolius et al. |
| 2017/0268513 | A1 | 9/2017 | Schaefer et al. |
| 2018/0050578 | A1 | 2/2018 | Connell et al. |
| 2019/0323497 | A1 | 10/2019 | Raskar et al. |
| 2020/0003464 | A1 | 1/2020 | Fan et al. |
| 2020/0072521 | A1 | 3/2020 | Goel et al. |
| 2023/0235925 | A1 * | 7/2023 | Kondou ................. F25B 7/00 62/468 |

FOREIGN PATENT DOCUMENTS

| | | |
|---|---|---|
| CN | 103335436 A | 10/2013 |
| CN | 205245597 U | 5/2016 |
| CN | 105473856 B | 7/2017 |
| CN | 106949681 A | 7/2017 |
| CN | 107757304 A | 3/2018 |
| CN | 109114237 A | 1/2019 |
| CN | 110749133 A | 2/2020 |
| CN | 210801675 U | 6/2020 |
| EP | 1548379 B1 | 9/2007 |
| EP | 2754980 A1 | 7/2014 |
| JP | S58010177 A | 1/1983 |
| JP | S5876862 U | 5/1983 |
| JP | S6238888 A | 2/1987 |
| JP | 2001-324231 A | 11/2001 |
| JP | 2005076515 A | 3/2005 |
| JP | 5064561 B2 | 10/2012 |
| KR | 100388675 B1 | 6/2003 |

OTHER PUBLICATIONS

Office Action regarding Chinese Patent Application No. 201710150253.0, dated Aug. 10, 2018. Translation provided by Unitalen Attorneys at Law.

Office Action regarding U.S. Appl. No. 15/445,137, dated Nov. 29, 2018.

Office Action regarding U.S. Appl. No. 15/445,137, dated May 22, 2019.

Office Action regarding U.S. Appl. No. 15/445,137, dated Oct. 2, 2019.

Office Action regarding U.S. Appl. No. 15/445,137, dated Oct. 5, 2020.

Office Action regarding Chinese Patent Application No. 201910319434.0, dated Nov. 6, 2020. Translation provided by Unitalen Attorneys at Law.

Restriction Requirement regarding U.S. Appl. No. 16/387,694, dated Dec. 2, 2020.

Notice of Allowance regarding U.S. Appl. No. 15/445,137, dated Dec. 21, 2020.

Office Action regarding U.S. Appl. No. 16/387,694, dated Feb. 18, 2021.

Second Chinese Office Action regarding Application No. 201910319434.0 dated Jul. 2, 2021. English translation provided by Unitalen Attorneys at Law.

Final Office Action regarding U.S. Appl. No. 16/387,694 dated Aug. 17, 2021.

Non-Final Office Action regarding U.S. Appl. No. 16/387,694 dated Jan. 27, 2022.

Notice of Allowance regarding U.S. Appl. No. 16/387,694 dated Apr. 12, 2022.

Office Action regarding Chinese Patent Application No. 201910319434.0, dated Sep. 1, 2023. Translation provided by Unitalen Attorneys at Law.

International Search Report and Written Opinion regarding App. No. PCT/US2023/025299, dated Sep. 26, 2023.

International Search Report and Written Opinion regarding App. No. PCT/US2024/031764 dated Sep. 6, 2024.

International Search Report regarding Application No. PCT/US2022/030513 dated Sep. 15, 2022.

Written Opinion of the ISA regarding Application No. PCT/US2022/030513 dated Sep. 15, 2022.

Indian Office Action regarding Application No. 202121022956, dated Dec. 30, 2022.

Non-Final Office Action regarding U.S. Appl. No. 17/749,997 dated Jun. 22, 2023.

(56) References Cited

OTHER PUBLICATIONS

Notice of Allowance regarding U.S. Appl. No. 17/749,997 dated Oct. 16, 2023.
Notice of Allowance regarding U.S. Appl. No. 17/749,997 dated Nov. 7, 2023.
Proposal on Installation of Tandem Scroll Compressor—Sep. 20, 2007, Scroll Compressor Sales Head Office.
Search Report regarding European Patent Application No. 228119129, dated Mar. 31, 2025.

* cited by examiner

MULTIPLE-COMPRESSOR SYSTEM WITH OIL BALANCE CONTROL

CROSS-REFERENCE TO RELATED APPLICATIONS

This application claims the benefit and priority of Indian Patent Application No. 202221047293, filed Aug. 19, 2022. The entire disclosure of the above application is incorporated herein by reference.

FIELD

The present disclosure relates to a climate-control system, and more particularly, to a multiple-compressor system with oil balance control.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and one or more compressors circulating a working fluid (e.g., refrigerant or carbon dioxide) between the indoor and outdoor heat exchangers. During operation of a multiple-compressor system, an oil level in one or more of the compressors may decrease while an oil level in another one or more of the compressors may increase. The present disclosure provides means for and method steps for equalizing the oil levels between the multiple compressors and/or reducing (or eliminating) an oil deficit in one or more of the compressors. Maintaining adequate oil levels in the compressors will improve efficiency and reliability of the compressors and will enable the climate-control system to effectively and efficiently provide a cooling and/or heating effect on demand.

SUMMARY

This section provides a general summary of the disclosure and is not a comprehensive disclosure of its full scope or all of its features.

The present disclosure provides a climate-control system that may include a first compressor, a second compressor, and a suction manifold. The first compressor may include a first shell and a first compression mechanism. The first shell may include a first suction inlet through which working fluid is drawn into the first compressor for compression in the first compression mechanism. The second compressor may include a second shell and a second compression mechanism. The second shell may include a second suction inlet through which working fluid is drawn into the second compressor for compression in the second compression mechanism. The suction manifold may include a first arm and a second arm. The first arm may be coupled to the first suction inlet and may be configured to provide working fluid to the first suction inlet. The second arm may be coupled to the second suction inlet and may be configured to provide working fluid to the second suction inlet. The second arm includes a first suction pipe, a second suction pipe, and a suction valve. The suction valve may be movable between: (i) a first position in which fluid flow through the second suction pipe is prevented and working fluid is allowed to flow through the first suction pipe to the second suction inlet, and (ii) a second position in which fluid flow through the first suction pipe is prevented and working fluid is allowed to flow through the second suction pipe to the second suction inlet.

In some configurations, the climate-control system of the above paragraph may include a control module in communication with the suction valve and controlling a position of the suction valve to control lubricant levels in the first and second shells.

In some configurations of the climate-control system of either of the above paragraphs, the control module controls the position of the suction valve based on which of the first and second compressors are operating and which are in a shutdown state.

In some configurations of the climate-control system of any of the above paragraphs, the control module controls the position of the suction valve based on capacity levels of the first and second compressors.

In some configurations of the climate-control system of any of the above paragraphs, the control module controls the position of the suction valve based on data received from a high-side sensor and a low-side sensor.

In some configurations of the climate-control system of any of the above paragraphs, the high-side sensor is disposed upstream of an expansion device and downstream of discharge outlets of the first and second compressors.

In some configurations of the climate-control system of any of the above paragraphs, the low-side sensor is disposed downstream of the expansion device and upstream of the first and second suction inlets.

In some configurations of the climate-control system of any of the above paragraphs, fluid flow through the second suction pipe is restricted more than fluid flow through the first suction pipe.

In some configurations of the climate-control system of any of the above paragraphs, the first suction pipe has a first diameter and the second suction pipe has a second diameter. The first diameter is larger than the second diameter.

In some configurations of the climate-control system of any of the above paragraphs, the larger restriction of fluid flow through the second suction pipe is due to bends in the second suction pipe.

In some configurations of the climate-control system of any of the above paragraphs, the position of the suction valve is determined based on a predefined operating-envelope map.

In some configurations of the climate-control system of any of the above paragraphs, the suction manifold includes an inlet configured to receive suction-pressure working fluid from a heat exchanger. A first portion of the working fluid received in the inlet of the suction manifold flows to the first arm of the suction manifold a second portion of the working fluid received in the inlet of the suction manifold flows to the second arm of the suction manifold.

In another form, the present disclosure provides a climate-control system that may include a first compressor, a second compressor, a lubricant equalization conduit, and a suction manifold. The first compressor may include a first shell and a first compression mechanism. The first shell may define a first suction chamber from which the first compression mechanism draws working fluid. The first shell may include a first suction inlet through which working fluid is drawn into the first suction chamber for compression in the first compression mechanism. The second compressor may include a second shell and a second compression mechanism. The second shell may define a second suction chamber from which the second compression mechanism draws working fluid. The second shell may include a second suction inlet through which working fluid is drawn into the second suction chamber for compression in the second compression mechanism. The lubricant equalization conduit may extend between the first and second compressors and may be in fluid communication with lubricant sumps of the first and second compressors. The suction manifold may include a first arm and a second arm. The first arm may be coupled to the first suction inlet and may be configured to provide working fluid to the first suction inlet. The second arm may be coupled to the second suction inlet and may be configured to provide working fluid to the second suction inlet. The second arm may include a first suction pipe, a second suction pipe, and a suction valve. The suction valve may be movable between: (i) a first position in which fluid flow through the second suction pipe is prevented and working fluid is allowed to flow through the first suction pipe to the second suction inlet, and (ii) a second position in which fluid flow through the first suction pipe is prevented and working fluid is allowed to flow through the second suction pipe to the second suction inlet.

In some configurations, the climate-control system of the above paragraph may include a control module in communication with the suction valve and controlling a position of the suction valve to control lubricant levels in the first and second shells. The control module may be configured to equalize pressures within first and second suction chambers of the first and second compressors by controlling the position of the suction valve to maintain the lubricant levels in lubricant sumps of the first and second compressors above the lubricant equalization conduit.

In some configurations of the climate-control system of either of the above paragraphs, the position of the suction valve is determined based on a predefined operating-envelope map.

In some configurations of the climate-control system of any of the above paragraphs, the control module controls the position of the suction valve based on which of the first and second compressors are operating and which are in a shutdown state.

In some configurations of the climate-control system of any of the above paragraphs, the control module controls the position of the suction valve based on capacity levels of the first and second compressors.

In some configurations of the climate-control system of any of the above paragraphs, the control module controls the position of the suction valve based on data received from a high-side sensor and a low-side sensor.

In some configurations of the climate-control system of the above paragraph, the high-side sensor is disposed upstream of an expansion device and downstream of discharge outlets of the first and second compressors, and the low-side sensor is disposed downstream of the expansion device and upstream of the first and second suction inlets.

In some configurations of the climate-control system of any of the above paragraphs, fluid flow through the second suction pipe is restricted more than fluid flow through the first suction pipe.

In some configurations of the climate-control system of any of the above paragraphs, the first suction pipe has a first diameter and the second suction pipe has a second diameter. The first diameter is larger than the second diameter.

In some configurations of the climate-control system of any of the above paragraphs, the larger restriction of fluid flow through the second suction pipe is due to bends in the second suction pipe.

In some configurations of the climate-control system of any of the above paragraphs, the position of the suction valve is determined based on a predefined operating-envelope map.

In some configurations of the climate-control system of any of the above paragraphs, the suction manifold includes an inlet configured to receive suction-pressure working fluid from a heat exchanger.

In some configurations of the climate-control system of the above paragraph, a first portion of the working fluid received in the inlet of the suction manifold flows to the first arm of the suction manifold and a second portion of the working fluid received in the inlet of the suction manifold flows to the second arm of the suction manifold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
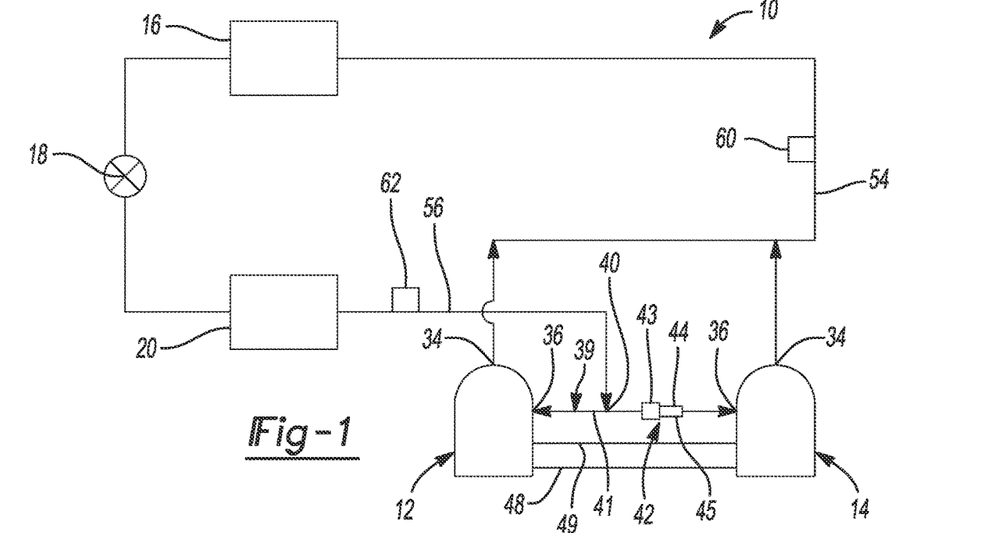
FIG. 1 is a schematic representation of a climate-control system according to the principles of the present disclosure.

With reference to FIG. 1, a climate-control system 10 is provided that may include a first compressor 12, a second compressor 14, a first heat exchanger (e.g., a condenser or gas cooler) 16, an expansion device (e.g., an expansion valve or capillary tube) 18, and a second heat exchanger (e.g., an evaporator) 20. The climate-control system 10 may be a refrigeration system, an air-conditioning system, a heat-pump system, etc. While the climate-control system 10 shown in FIG. 1 includes two compressors, in some configurations, the climate-control system 10 may include more than two compressors.

Figure 2:
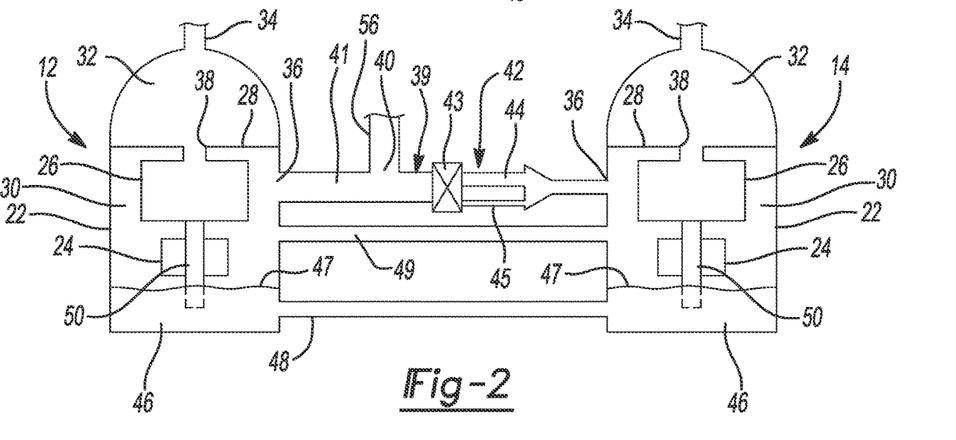
FIG. 2 is a schematic representation of first and second compressors of the climate-control system.

Referring now to FIG. 2, each of the first and second compressors 12, 14 may include a shell 22, a motor 24, and a compression mechanism 26. The shell 22 defines a compressor housing in which the motor 24 and compression mechanism 26 are disposed. The shell 22 may include a partition 28 that separates a suction chamber 30 from a discharge chamber 32. A discharge outlet 34 may be attached to the shell 22 and may receive compressed working fluid from the discharge chamber 32. The partition 28 may include a discharge passage 38 therethrough providing communication between the compression mechanism 26 and the discharge chamber 32. A suction inlet 36 may be attached to the shell 22 and may provide suction-pressure working fluid to the suction chamber 30.

A suction manifold 39 may be fluidly coupled to the suction inlets 36 of both of the compressors 12, 14. The suction manifold 39 may include an inlet 40, a first arm 41, and a second arm 42. The inlet 40 of the suction manifold 39 may receive working fluid from a suction conduit 56. The first arm 41 may fluidly connect the inlet 40 with the suction inlet 36 of the first compressor 12. The second arm 42 of the suction manifold 39 may fluidly connect the inlet 40 with the suction inlet 36 of the second compressor 14. In this manner, working fluid from the inlet 40 can flow to the first compressor 12 via the first arm 41 and to the second compressor 14 via the second arm 42.

The second arm 42 of the suction manifold 39 may include a suction valve 43, a first suction pipe 44, and a second suction pipe 45. The suction valve 43 can be a solenoid valve, for example, or any suitable type of valve (e.g., an electromechanical, pneumatic, or hydraulic valve). The suction valve 43 is fluidly coupled with and controls fluid flow through the first and second suction pipes 44, 45. That is, the suction valve 43 may be movable between: (i) a first position in which fluid flow through the second suction pipe 45 is prevented and working fluid is allowed to flow from the inlet 40 of the suction manifold 39 and through the first suction pipe 44 to the suction inlet 36 of the second compressor 14, and (ii) a second position in which fluid flow through the first suction pipe 44 is prevented and working fluid is allowed to flow from the inlet 40 of the suction manifold 39 and through the second suction pipe 45 to the suction inlet 36 of the second compressor 14. In some configurations, the suction valve 43 is movable to a third position in which fluid flow through both of the first and second suction pipes 44, 45 is prevented (i.e., to prevent fluid flow into the second compressor 14 when only the second compressor 14 is shutdown).

Figure 4:
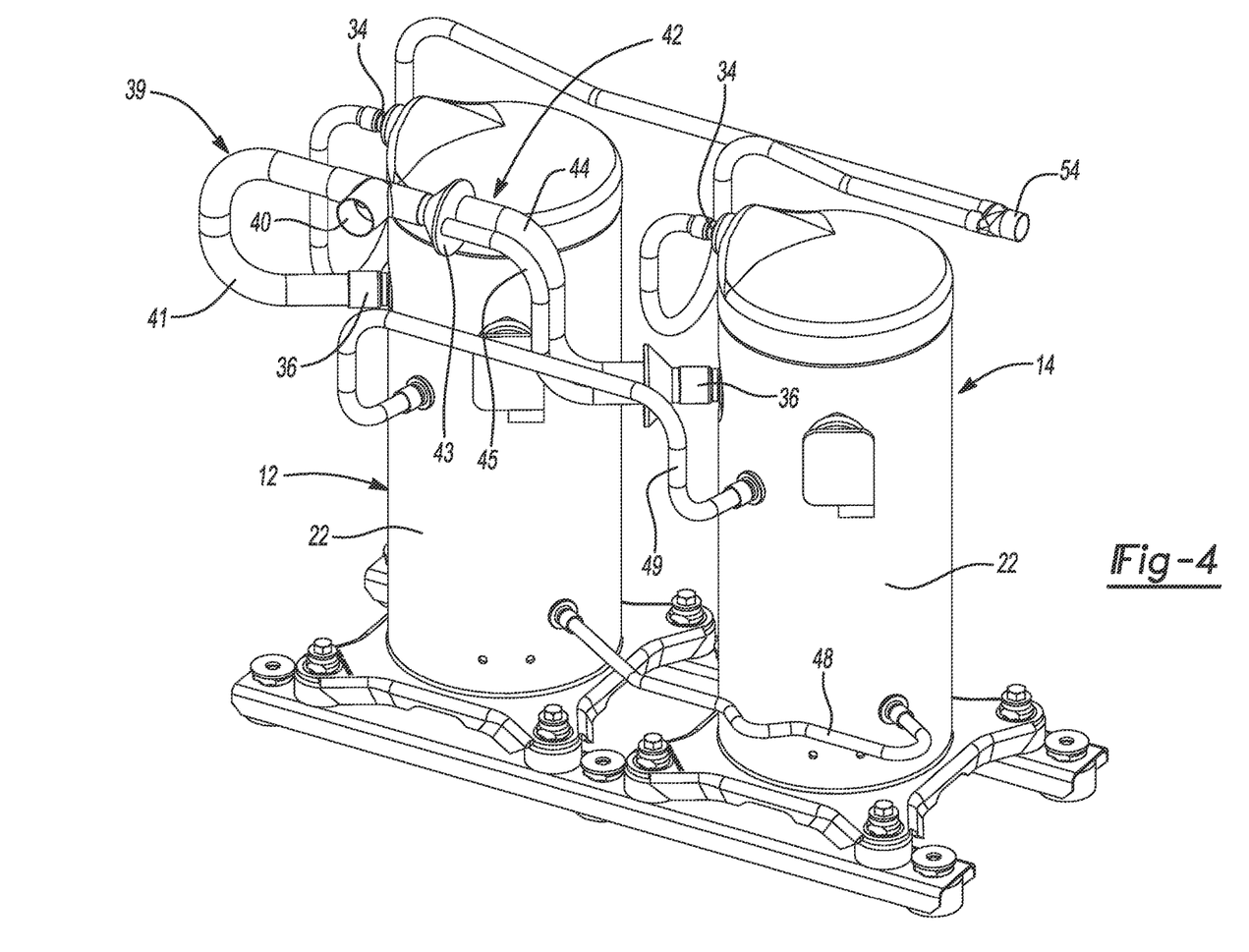
FIG. 4 is a perspective view of the first and second compressors of the climate-control system.
Figure 5:
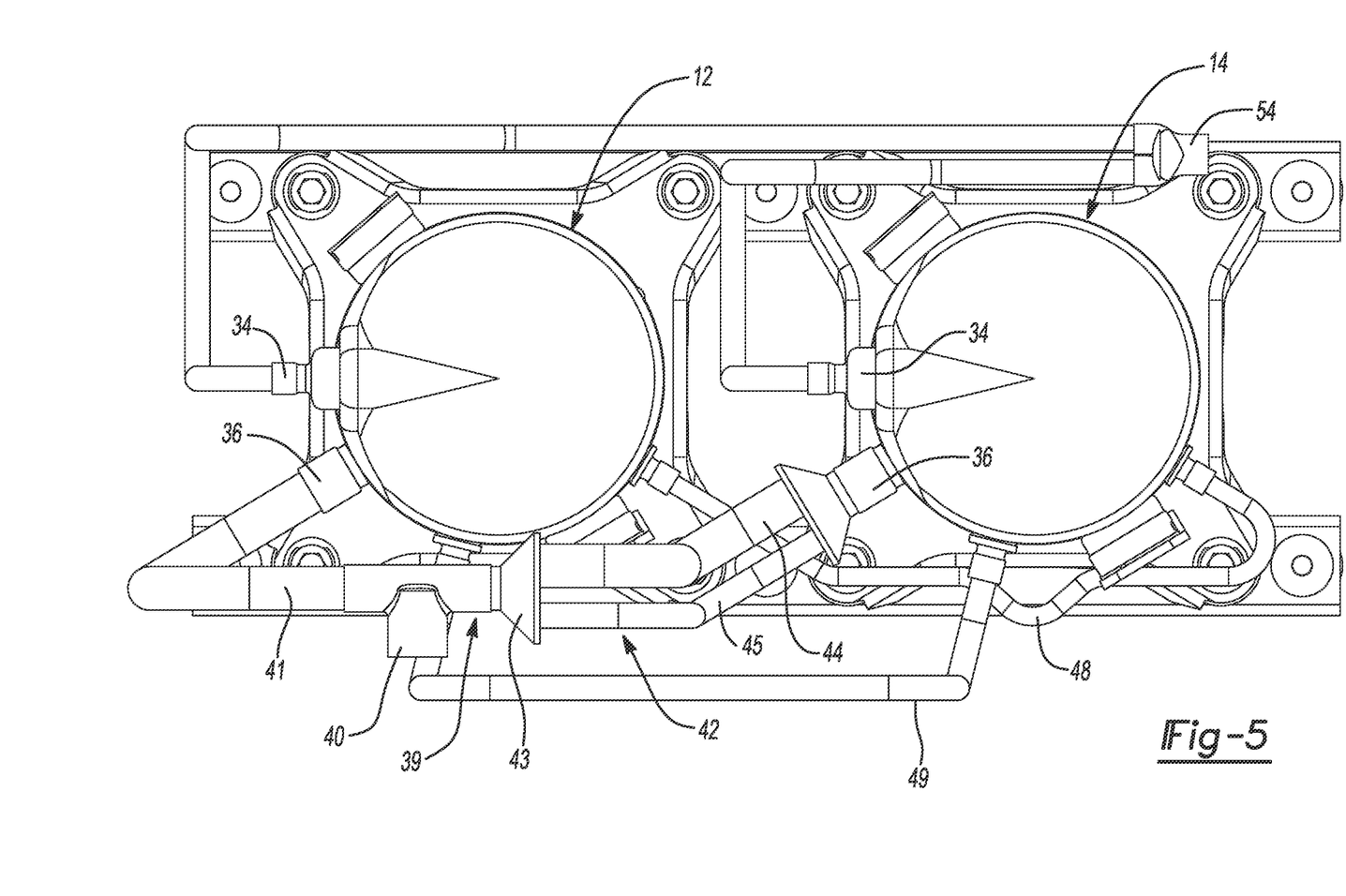
FIG. 5 is an overhead view of the first and second compressors of the climate-control system.

The first and second suction pipes 44, 45 may be configured such that the second suction pipe 45 restricts flow into the suction inlet 36 of the second compressor 14 more than the first suction pipe 44 restricts flow into the suction inlet 36 of the second compressor 14. That is, the second suction pipe 45 produces a larger pressure drop of fluid flow therethrough than the pressure drop of fluid flow through the first suction pipe 44. For example, in some configurations, a diameter of the first suction pipe 44 may be larger than a diameter of the second suction pipe 45 (as shown in FIGS. 2, 4, and 5) to produce the greater pressure drop. In some configurations, the second suction pipe 45 may have more bends and/or one or more sharper (tighter) bends than the first suction pipe 44 to produce the greater pressure drop (as will be described in more detail below with reference to FIGS. 8-10).

As shown in FIG. 2, a lower end of the shell 22 of each of the compressors 12, 14 may define a lubricant sump 46 containing a volume of liquid lubricant (e.g., oil). A lubricant equalization conduit 48 (FIGS. 2, 4, and 5) may extend between the first and second compressor 12, 14 and may be fluidly coupled with oil fittings attached to the shells 22 such that the lubricant equalization conduit 48 is in fluid communication with the lubricant sumps 46 of both of the compressors 12, 14 (i.e., so that lubricant can flow between the lubricant sumps 46 of the first and second compressors 12, 14 through the lubricant equalization conduit 48). A gas equalization conduit 49 (FIGS. 2, 4, and 5) may extend between the first and second compressor 12, 14 and may be fluidly coupled with fittings attached to the shells 22 such that the gas equalization conduit 49 is in fluid communication with the suction chambers 30 of both of the compressors 12, 14.

The motor 24 (FIG. 2) of each compressor 12, 14 may include a stator and a rotor. The stator may be press fit into the shell 22. The rotor may be fixed to a driveshaft 50, and the driveshaft 50 may drive the compression mechanism 26. The compression mechanism 26 may be a scroll compression mechanism including first and second scrolls (e.g., an orbiting scroll and a non-orbiting scroll or a pair of co-rotating scrolls) that include spiral wraps that cooperate to define compression pockets therebetween. It will be appreciated that the compression mechanism 26 could be any other type of compression mechanism, such as a rotary compression mechanism (e.g., with an eccentric rotor rotating within a cylinder, and with a reciprocating vane extending into the cylinder) or a reciprocating compression mechanism (e.g., with a piston reciprocating within a cylinder), for example.

The second compressor 14 may be operable at a lower capacity than the first compressor 12. In some examples, one or both of the compressors 12, 14 may be variable-capacity compressors. That is, one or both of the compressors 12, 14 could be or include one or more of: a multi-stage compression mechanism, a multi-speed or variable-speed motor, a vapor-injection system (e.g., an economizer circuit), a pulse-width-modulated scroll compressor configured for scroll separation (e.g., a digital scroll compressor), and a compressor having capacity-modulation valves configured to leak intermediate-pressure working fluid. It will be appreciated that one or both of the compressors 12, 14 could include any other additional or alternative structure for varying its capacity and/or the operating capacity of the climate-control system 10. Example variable-capacity compressors are disclosed in Assignee's commonly owned U.S. Pat. Nos. 8,616,014, 6,679,072, 8,585,382, 6,213,731, 8,485,789 and 8,459,053, the disclosures of which are hereby incorporated by reference. A control module 52 (FIG. 3) may control operation of the compressors 12, 14, including starting up the compressors 12, 14, shutting down the compressors 12, 14, and adjusting or modulating the capacities of the compressors 12, 14.

Referring now to FIGS. 1 and 2, during operation of the climate-control system 10, the compression mechanism 26 of one or both of the compressors 12, 14 may draw suction-pressure working fluid (e.g., refrigerant, carbon dioxide, etc.) from their respective suction chambers 30, may compress the working fluid to a higher pressure, and may discharge the compressed working fluid into their respective discharge chambers 32. The compressed working fluid in the discharge chambers 32 of the compressors 12, 14 may flow through the discharge outlets 34 and into a discharge conduit 54.

Working fluid in the discharge conduit 54 may flow through the first heat exchanger 16 where heat is absorbed from the working fluid. From the first heat exchanger 16, the working fluid may flow through the expansion device 18. The pressure and temperature of the working fluid drop as the working fluid flows through the expansion device 18. From the expansion device 18, the working fluid may flow through the second heat exchanger 20, where the working fluid absorbs heat from a space to be cooled. From the second heat exchanger 20, the working fluid flows to the suction manifold 39 via the suction conduit 56. From the suction manifold 39, working fluid may flow into one or both of the compressors 12, 14 through the suction inlets 36. The suction valve 43 controls the flow of working fluid into the first and second compressors 12, 14, respectively.

The control module 52 (FIG. 3) may be in communication with the suction valve 43 and may control operation of the suction valve 43 to equalize (or reduce differences between) the pressures of fluid within the suction chambers 30 of the first and second compressors 12, 14. Equalizing the pressures of fluid within the suction chambers 30 of the first and second compressors 12, 14 maintains a balance of lubricant (i.e., equalizes lubricant levels) in the sumps 46 of the first and second compressors 12, 14. This prevents the lubricant level within either of the compressors 12, 14 from getting too low so that both compressors 12, 14 remain adequately lubricated. For example, the control module 52 may control the suction valve 43 to maintain lubricant levels 47 in the lubricant sumps 46 of both of the first and second compressors 12, 14 vertically above the lubricant equalization conduit 48, as shown in FIG. 2.

The suction valve 43 can be any suitable type of valve that can be movable among the first position (allowing fluid flow through the first suction pipe 44 and preventing fluid flow through the second suction pipe 45) and the second position (allowing fluid flow through the second suction pipe 45 and preventing fluid flow through the first suction pipe 44). In some configurations, the suction valve 43 may be movable to one or more intermediate positions between the first and second positions. The suction valve 43 could be a ball valve, a butterfly valve, or any other type of valve driven by a solenoid, stepper motor, or any other suitable actuator.

In some configurations, the control module 52 may control the suction valve 43 based on operating parameters of the climate-control system 10. For example, the control module 52 may control the suction valve 43 based on information received from a first sensor 60 and/or a second sensor 62. In some configurations, the first sensor 60 may be a high-side sensor (e.g., a temperature or pressure sensor disposed along the discharge conduit 54) and the second sensor 62 may be a low-side sensor (e.g., a temperature or pressure sensor disposed along the suction conduit 56).

Figure 6:
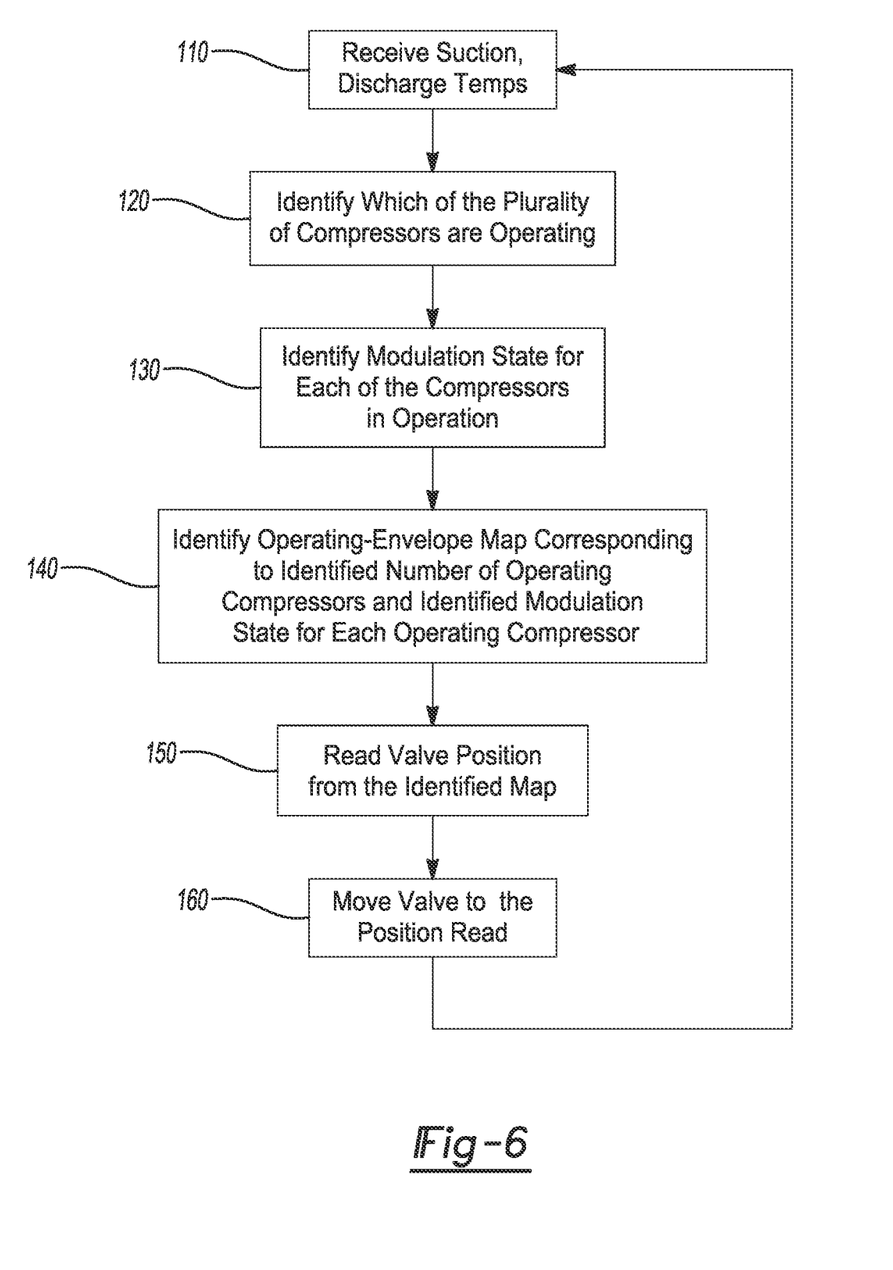
FIG. 6 is a flowchart showing steps performed by the control module to control the suction valves.

The control module 52 can perform the steps shown in FIG. 6 to intermittently or continuously adjust the position of the suction valve 43 based on operating conditions of the compressors 12, 14 and/or the climate-control system 10 to equalize the pressures of fluid within the suction chambers 30 of the first and second compressors 12, 14.

Figure 3:
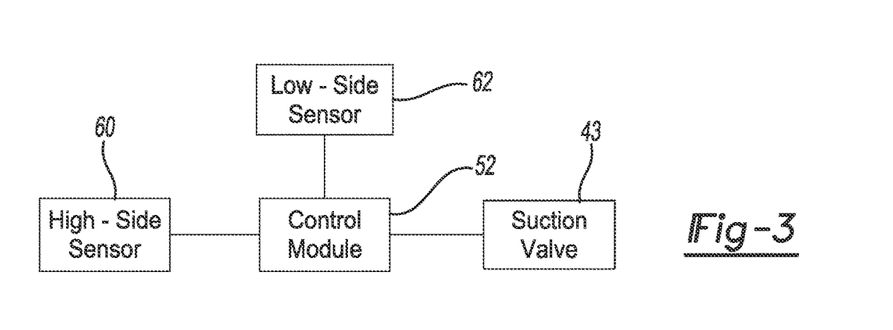
FIG. 3 is a diagram depicting a control module of the climate-control system in communication with sensors and a suction valve of the climate-control system.

As shown in FIG. 6, the control module 52 may, at step 110, receive a high-side temperature value (or high-side pressure value) from the high-side sensor 60 (FIGS. 1 and 3) and a low-side temperature value (or low-side pressure value) from the low-side sensor 62 (FIGS. 1 and 3). The high-side sensor 60 may be a temperature sensor (or pressure sensor) disposed along the discharge conduit 54 or on the first heat exchanger 16, for example. Therefore, the high-side temperature value may be a discharge temperature or a condensing temperature. The low-side sensor 62 may be a temperature sensor (or pressure sensor) disposed along the suction conduit 56 or on the second heat exchanger 20, for example. Therefore, the low-side temperature value may be a suction temperature or an evaporating temperature.

At step 120, the control module 52 may identify which one or ones of the compressors 12, 14 are currently operating (i.e., which compressors 12, 14 are not in a shutdown state). This can be done in a variety of ways, including, for example, reading electrical current values from sensors measuring electrical current draw of the motors 24 of the compressors 12, 14, reading pressure and/or temperature values from sensors at or near the discharge and/or suction inlets 34, 36 of the compressors 12, 14, and/or referencing the status of other algorithms that the control module 52 performs for controlling, diagnosing and/or protecting the compressors 12, 14. In some configurations, additional or alternative means or steps may be employed by the control module 52 to identify which one or ones of the compressors 12, 14 are currently operating.

At step 130, the control module 52 may identify a modulation state or capacity level of the one or more compressors 12, 14 that were identified at step 120 as currently operating. That is, at step 130, the control module 52 may identify, for each compressor 12, 14 currently operating, whether the compressor(s) 12, 14 are operating at zero capacity, full capacity, or an intermediate capacity level between zero and full. The control module 52 may also identify the value of the intermediate capacity level at which one or more of the compressors 12, 14 may be currently operating. Identifying the capacity levels of the compressors 12, 14 that are operating may be done in a variety of ways, including, for example, reading electrical current values from sensors measuring electrical current draw of the motors 24 of the compressors 12, 14, reading pressure and/or temperature values from sensors at or near the discharge and/or suction inlets 34, 36 of the compressors 12, 14, and/or referencing the status of other algorithms that the control module 52 performs for controlling, diagnosing and/or protecting the compressors 12, 14. In some configurations, additional or alternative means or steps may be employed by the control module 52 to identify the capacity levels of the compressors 12, 14 that are operating.

Figure 7:
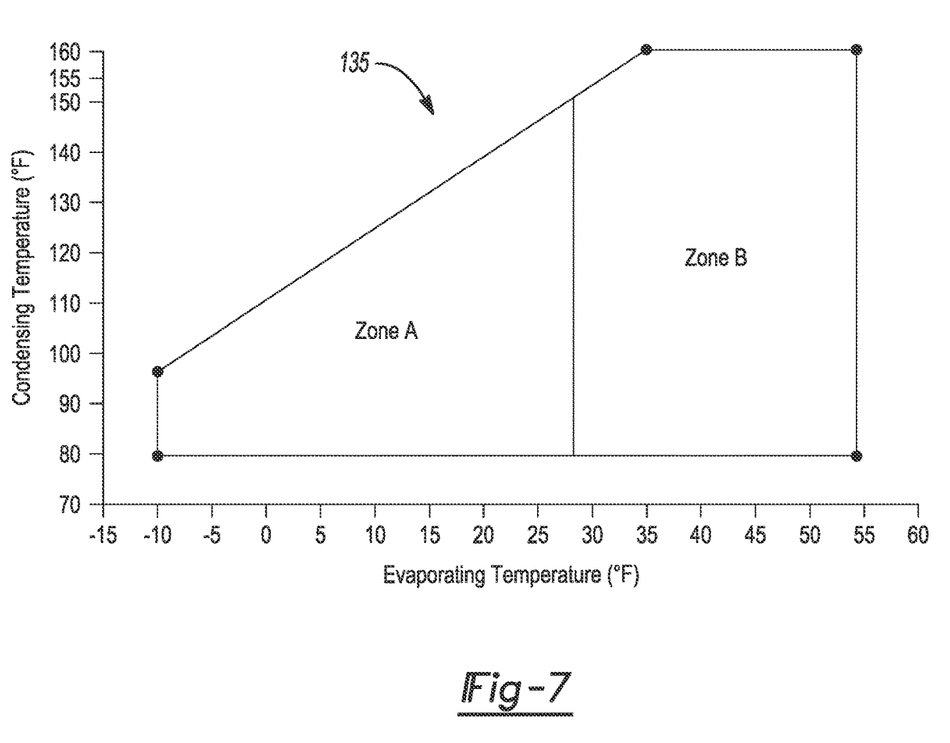
FIG. 7 is an example operating-envelope map according to the principles of the present disclosure.

One or more predefined operating-envelope maps may be stored within a memory of the control module 52 or the memory of a module in communication with the control module 52. FIG. 7 depicts an example of an operating-envelope map 135 that could be included in the plurality of predefined operating-envelope maps. The operating-envelope maps stored in the memory may include additional or different operating-envelope maps that correspond to the different combinations of information that could be identified by the control module 52 at steps 120 and 130.

At step 140, the control module 52 may identify one of the operating-envelope maps corresponding to: (a) the identified number of operating compressors 12, 14 (identified in step 120), and (b) the identified modulation state (capacity level) of the operating compressor(s) 12, 14. For example, if the control module 52 determines at steps 120 and 130 that both of the compressors 12, 14 are currently operating and are both operating at an intermediate capacity level, then the control module 52 may identify, at step 140, the one of the operating-envelope maps (such as the operating-envelope map 135 shown in FIG. 7) that corresponds to such conditions. As another example, if the control module 52 determines at steps 120 and 130 that both of the compressors 12, 14 are currently operating and the first compressor 12 is operating at an intermediate capacity level and the second compressor 14 is operating at a full capacity level, then the control module 52 may identify, at step 140, the one of the operating-envelope maps (such as an operating-envelope map different from the operating-envelope map 135 shown in FIG. 7) that corresponds to such conditions. Stored in the memory may be a variety of operating-envelope maps that correspond to different combinations of conditions identified at steps 120, 130.

Once the operating-envelope map that corresponds to the current conditions (i.e., the conditions identified at steps 120, 130) has been identified (at step 140), then the control module 52 may, at step 150, read the valve position on the identified operating-envelope map based on the low-side temperature (e.g., suction or evaporating temperature) value and the high-side temperature (e.g., discharge or condensing temperature) value received at step 110. The operating-envelope maps each include a plurality of regions, and each of the regions corresponds to different valve positions.

For example, the operating-envelope map 135 shown in FIG. 7 includes a first region labeled "Zone A" corresponding to the first position of the suction valve 43 (in which fluid flow through the first suction pipe 44 is allowed and fluid flow through the second suction pipe 45 is prevented), and a second region labeled "Zone B" corresponding to the second position of the suction valve 43 (in which fluid flow through the second suction pipe 45 is allowed and fluid flow through the first suction pipe 44 is prevented). Therefore, if the temperature values received at step 110 fall within the first region (Zone A), then the control module 52 will, at step 150, determine that the suction valve 43 should be moved to (or remain in) the first position. If the temperature values received at step 110 fall within the second region (Zone B), then the control module 52 will, at step 150, determine that the suction valve 43 should be moved to (or remain in) the second position. Valve positions can be determined in the same manner from other operating-envelope maps stored in the memory.

At step 160, the control module 52 may move the suction valve 43 to the valve position read at step 150. Moving the suction valve 43 to the position read at step 150 will equalize the pressures of fluid within the suction chambers 30 of the first and second compressors 12, 14 so that the lubricant levels in the first and second compressors 12, 14 can be maintained at approximately equal levels or at least at acceptable levels. The operating-envelope maps and the valve position values for each of the regions may be determined and plotted based on testing for a given climate-control system. That is, during testing of a given climate-control system, the valve position values may be set so that pressures of fluid within the suction chambers 30 of the first and second compressors 12, 14 are kept approximately equal.

After performing step 160, the control module 52 may loop back and perform steps 110-160 either continuously or intermittently. It will be appreciated that step 110 need not be performed before steps 120, 130, 140. Step 110 could be performed concurrently with any of steps 120, 130, 140 or after any of steps 120, 130, 140.

In some configurations, if the first compressor 12 is currently operating and the second compressor 14 is currently shutdown, the control module 52 may move the suction valve 43 to a third position preventing fluid flow through both of the first and second suction pipes 44, 45.

In some configurations, the control module 52 may, following step 160, determine lubricant levels in the sumps 46 of the compressors 12, 14 (e.g., from data received from oil-level sensors) and if the lubricant levels in the compressors 12, 14 are not equalizing or if the lubricant levels in one of the compressors 12, 14 is falling below a predetermined acceptable level, the control module 52 may apply a correction factor to adjust the valve position values of the operating-envelope maps to achieve acceptable lubricant levels.

In some configurations, the control module 52 may trigger a fault alert and/or a compressor protection algorithm if adequate lubricant levels are not being maintained in the compressors 12, 14.

While the climate-control system 10 is described above as having two compressors 12, 14, in some configurations, the climate-control system 10 could have three or more compressors and a plurality of suction valves.

Figure 8:
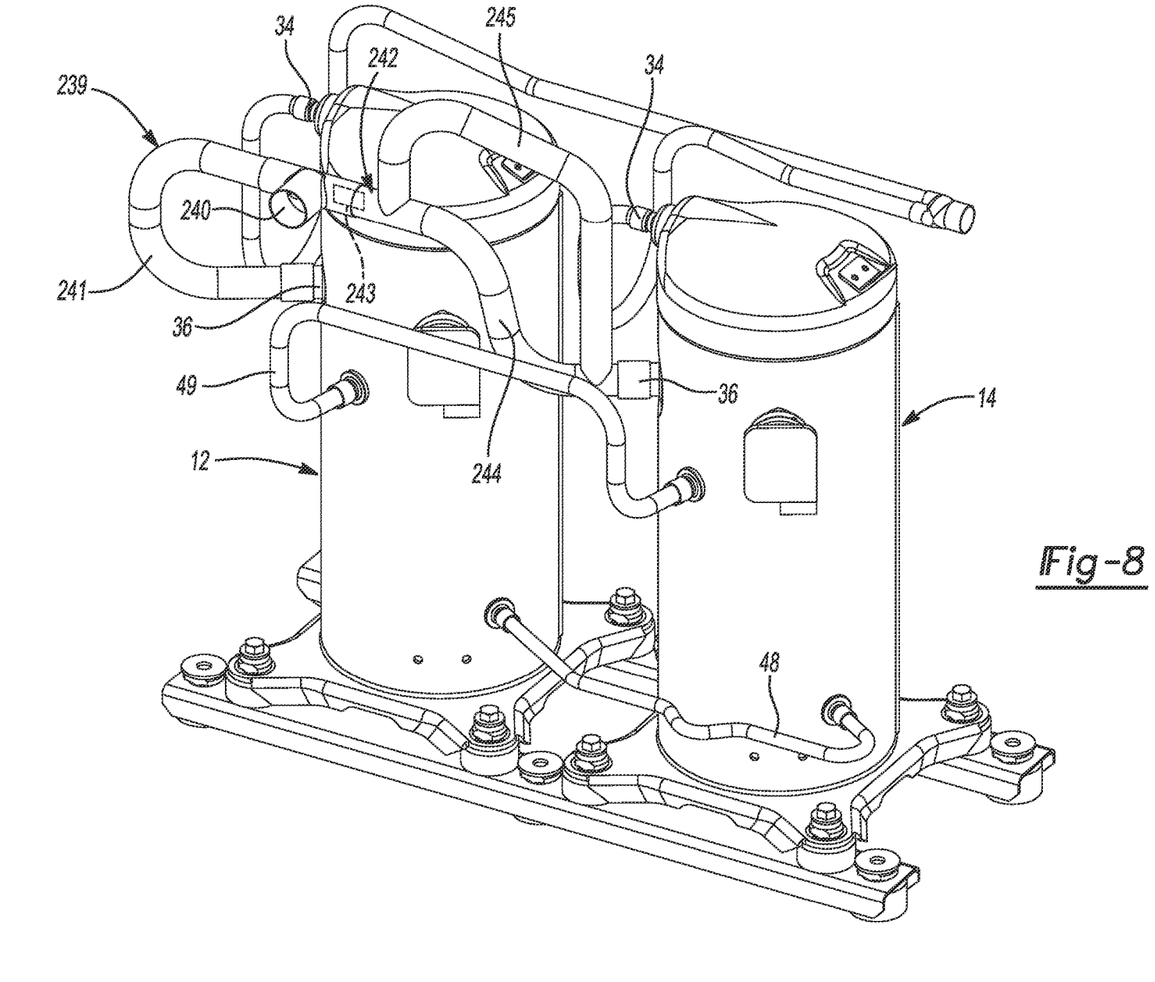
FIG. 8 is a perspective view of first and second compressors or another climate-control system according to the principles of the present disclosure.
Figure 9:
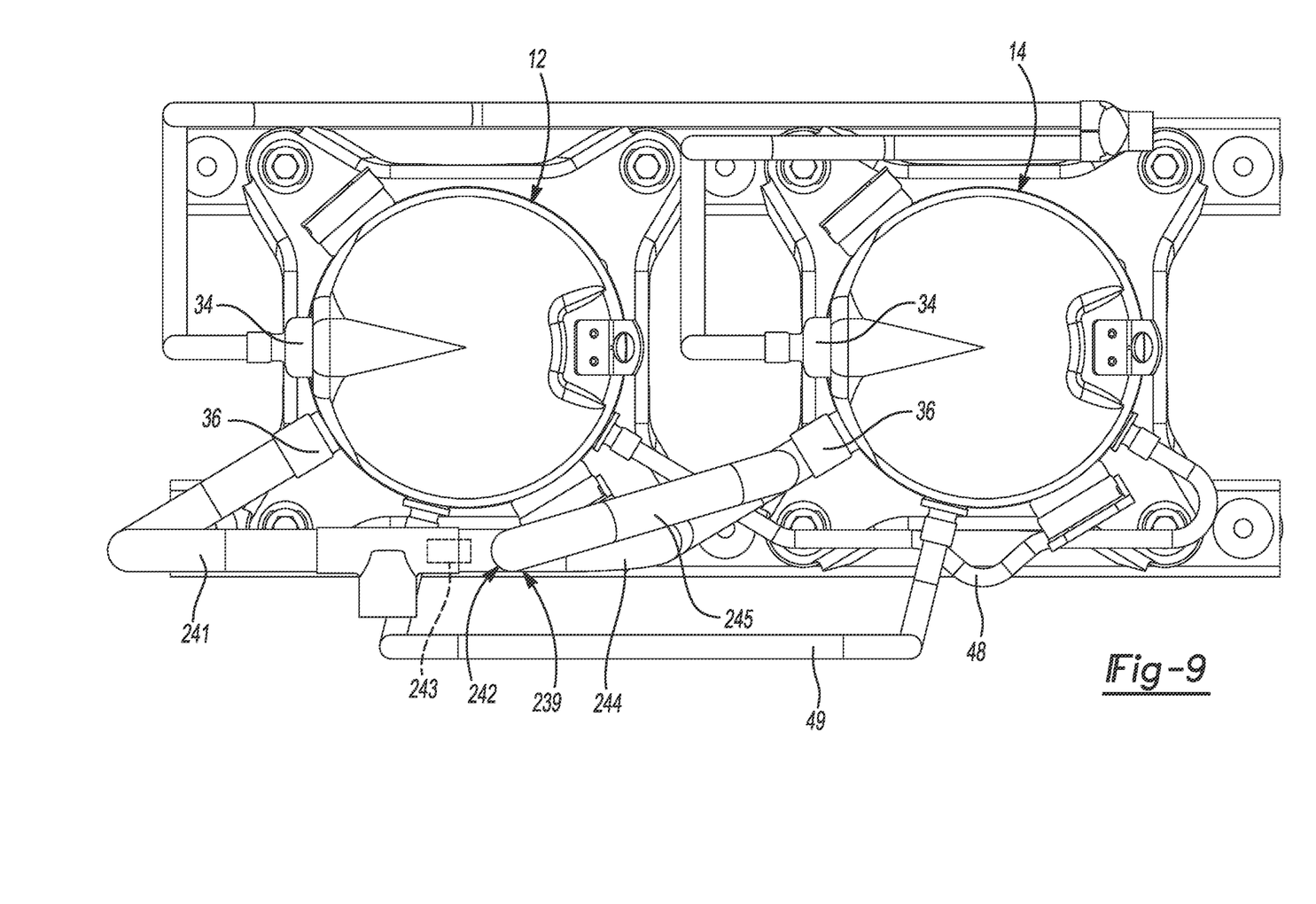
FIG. 9 is an overhead view of the first and second compressors of FIG. 8.
Figure 10:
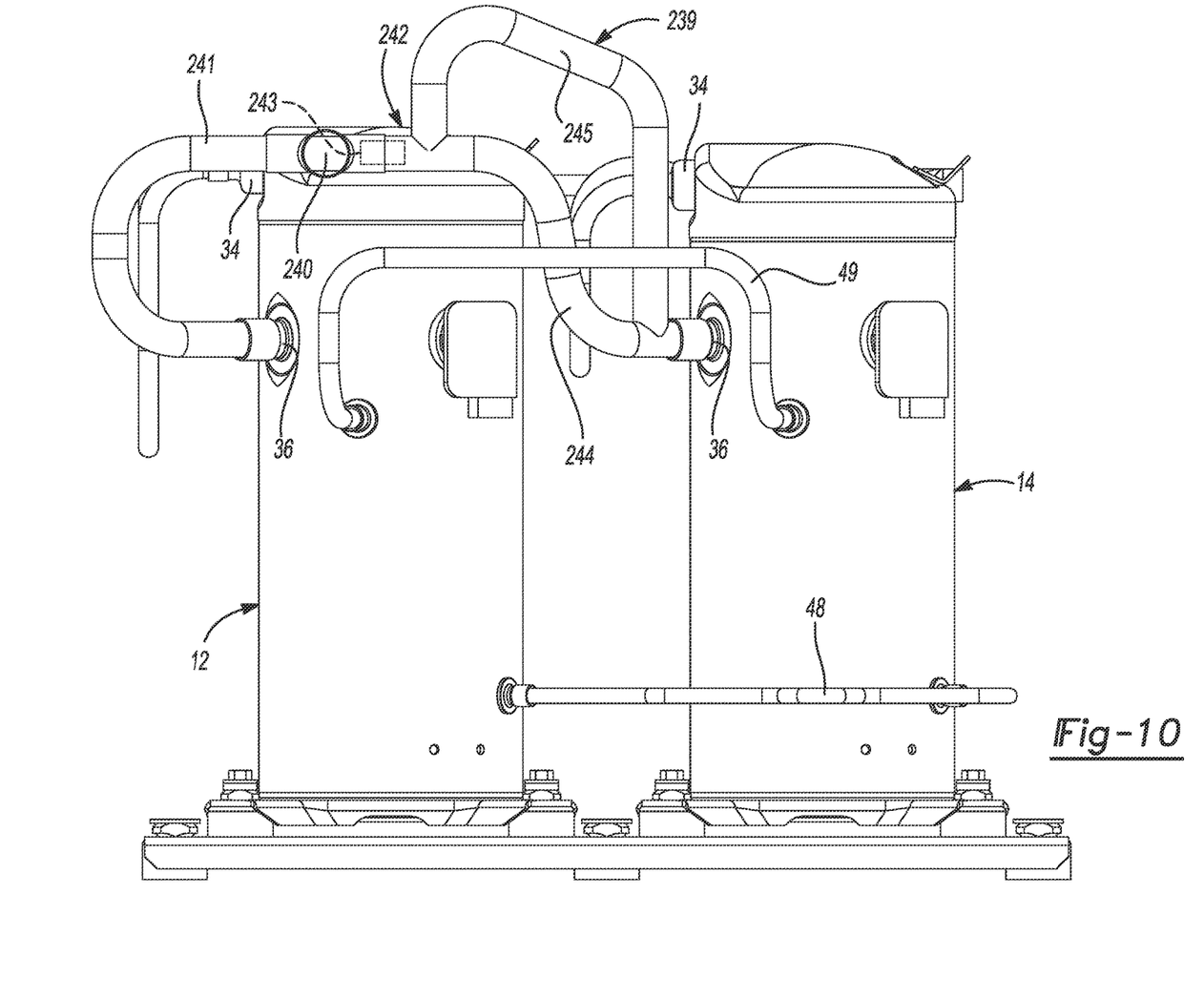
FIG. 10 is a side view of the first and second compressors of FIG. 8.

With reference to FIGS. 8-10, another suction manifold 239 is provided that could be incorporated into the climate-control system 10 in place of the suction manifold 39 described above. The structure and function of the suction manifold 239 may be similar or identical to that of the suction manifold 39 described above, apart from differences described below.

The suction manifold 239 may be fluidly coupled to the suction inlets 36 of both of the compressors 12, 14. The suction manifold 239 may include an inlet 240, a first arm 241, and a second arm 242. The inlet 240 of the suction manifold 239 may receive working fluid from the suction conduit 56 (FIG. 1). The first arm 241 may fluidly connect the inlet 240 with the suction inlet 36 of the first compressor 12. The second arm 242 of the suction manifold 239 may fluidly connect the inlet 240 with the suction inlet 36 of the second compressor 14. In this manner, working fluid from the inlet 240 can flow to the first compressor 12 via the first arm 241 and to the second compressor 14 via the second arm 242.

The second arm 242 of the suction manifold 239 may include a suction valve 243, a first suction pipe 244, and a second suction pipe 245. The suction valve 243 can be a solenoid valve, for example, or any suitable type of valve (e.g., an electromechanical, pneumatic, or hydraulic valve). The suction valve 243 is fluidly coupled with and controls fluid flow through the first and second suction pipes 244, 245. That is, the suction valve 243 may be movable between: (i) a first position in which fluid flow through the second suction pipe 245 is prevented and working fluid is allowed to flow from the inlet 240 of the suction manifold 239 and through the first suction pipe 244 to the suction inlet 36 of the second compressor 14, and (ii) a second position in which fluid flow through the first suction pipe 244 is prevented and working fluid is allowed to flow from the inlet 240 of the suction manifold 239 and through the second suction pipe 245 to the suction inlet 36 of the second compressor 14. In some configurations, the suction valve 243 is movable to a third position in which fluid flow through both of the first and second suction pipes 244, 245 is prevented (i.e., to prevent fluid flow into the second compressor 14 when only the second compressor 14 is shutdown).

The first and second suction pipes 244, 245 may be configured such that the second suction pipe 245 restricts flow into the suction inlet 36 of the second compressor 14 more than the first suction pipe 244 restricts flow into the suction inlet 36 of the second compressor 14. That is, the second suction pipe 245 produces a larger pressure drop of fluid flow therethrough than the pressure drop of fluid flow through the first suction pipe 244. For example, in some configurations, the second suction pipe 245 may have more bends and/or one or more sharper (tighter) bends than the first suction pipe 244 to produce the greater pressure drop (as shown in FIGS. 8-10). In some configurations, the first suction pipe 244 may also have larger diameter than a diameter of the second suction pipe 245. In other configurations, the diameters of the first and second suction pipes 244, 245 may be approximately equal to each other.

The control module 52 is in communication with and controls operation of the suction valve 243 in the same or similar manner as described above with respect to the suction valve 43. That is, the control module 52 may execute steps 110, 120, 130, 140, 150, 160 as shown in FIG. 6 and described above.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The figures and descriptions above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A climate-control system comprising:
    a first compressor including a first shell and a first compression mechanism, the first shell including a first suction inlet through which a working fluid is drawn into the first compressor for compression in the first compression mechanism;
    a second compressor including a second shell and a second compression mechanism, the second shell including a second suction inlet through which the working fluid is drawn into the second compressor for compression in the second compression mechanism; and
    a suction manifold having a first arm and a second arm, wherein the first arm is coupled to the first suction inlet and is configured to provide the working fluid to the first suction inlet, wherein the second arm is coupled to the second suction inlet and is configured to provide the working fluid to the second suction inlet,
    wherein the second arm includes a first suction pipe, a second suction pipe, and a suction valve, and
    wherein the suction valve is movable between: (i) a first position in which fluid flow through the second suction pipe is prevented and the working fluid is allowed to flow through the first suction pipe to the second suction inlet, and (ii) a second position in which fluid flow through the first suction pipe is prevented and the working fluid is allowed to flow through the second suction pipe to the second suction inlet.

2. The climate-control system of claim 1, further comprising a control module in communication with the suction valve and controlling a position of the suction valve to control lubricant levels in the first and second shells.

3. The climate-control system of claim 2, wherein the control module controls the position of the suction valve based on which one or more of the first and second compressors are operating.

4. The climate-control system of claim 3, wherein the control module controls the position of the suction valve based on capacity levels of the first and second compressors.

5. The climate-control system of claim 4, wherein the control module controls the position of the suction valve based on data received from a high-side sensor and a low-side sensor.

6. The climate-control system of claim 5, wherein the high-side sensor is disposed upstream of an expansion device and downstream of discharge outlets of the first and second compressors, and wherein the low-side sensor is disposed downstream of the expansion device and upstream of the first and second suction inlets.

7. The climate-control system of claim 1, wherein fluid flow through the second suction pipe is restricted more than fluid flow through the first suction pipe.

8. The climate-control system of claim 7, wherein the first suction pipe has a first diameter and the second suction pipe has a second diameter, and wherein the first diameter is larger than the second diameter.

9. The climate-control system of claim 7, wherein the larger restriction of fluid flow through the second suction pipe is due to bends in the second suction pipe.

10. The climate-control system of claim 1, wherein movement of the suction valve between the first and second positions is determined based on a predefined operating-envelope map.

11. The climate-control system of claim 1, wherein the suction manifold includes an inlet configured to receive the working fluid at a suction pressure from a heat exchanger, wherein a first portion of the working fluid received in the inlet of the suction manifold flows to the first arm of the suction manifold, and wherein a second portion of the working fluid received in the inlet of the suction manifold flows to the second arm of the suction manifold.

12. A climate-control system comprising:
- a first compressor including a first shell and a first compression mechanism, the first shell defining a first suction chamber from which the first compression mechanism draws a working fluid, the first shell including a first suction inlet through which the working fluid is drawn into the first suction chamber for compression in the first compression mechanism;
- a second compressor including a second shell and a second compression mechanism, the second shell defining a second suction chamber from which the second compression mechanism draws the working fluid, the second shell including a second suction inlet through which the working fluid is drawn into the second suction chamber for compression in the second compression mechanism;
- a lubricant equalization conduit extending between the first and second compressors and in fluid communication with lubricant sumps of the first and second compressors; and
- a suction manifold having a first arm and a second arm, wherein the first arm is coupled to the first suction inlet and is configured to provide the working fluid to the first suction inlet, wherein the second arm is coupled to the second suction inlet and is configured to provide the working fluid to the second suction inlet,
- wherein the second arm includes a first suction pipe, a second suction pipe, and a suction valve, and
- wherein the suction valve is movable between: (i) a first position in which fluid flow through the second suction pipe is prevented and the working fluid is allowed to flow through the first suction pipe to the second suction inlet, and (ii) a second position in which fluid flow through the first suction pipe is prevented and the working fluid is allowed to flow through the second suction pipe to the second suction inlet.

13. The climate-control system of claim 12, further comprising a control module in communication with the suction valve and controlling movement of the suction valve to control lubricant levels in the first and second shells, wherein the control module is configured to equalize pressures within first and second suction chambers of the first and second compressors by controlling movement of the suction valve to maintain the lubricant levels in lubricant sumps of the first and second compressors above the lubricant equalization conduit.

14. The climate-control system of claim 13, wherein movement of the suction valve between the first and second positions is determined based on a predefined operating-envelope map.

15. The climate-control system of claim 14, wherein the control module controls movement of the suction valve based on which one or more of the first and second compressors are operating,
- wherein the control module controls movement of the suction valve based on capacity levels of the first and second compressors,
- wherein the control module controls movement of the suction valve based on data received from a high-side sensor and a low-side sensor, and
- wherein the high-side sensor is disposed upstream of an expansion device and downstream of discharge outlets of the first and second compressors, and wherein the low-side sensor is disposed downstream of the expansion device and upstream of the first and second suction inlets.

16. The climate-control system of claim 12, wherein fluid flow through the second suction pipe is restricted more than fluid flow through the first suction pipe.

17. The climate-control system of claim 16, wherein the first suction pipe has a first diameter and the second suction pipe has a second diameter, and wherein the first diameter is larger than the second diameter.

18. The climate-control system of claim 16, wherein the larger restriction of fluid flow through the second suction pipe is due to bends in the second suction pipe.

19. The climate-control system of claim 12, wherein movement of the suction valve between the first and second positions is determined based on a predefined operating-envelope map.

20. The climate-control system of claim 12, wherein the suction manifold includes an inlet configured to receive the working fluid at a suction pressure from a heat exchanger, wherein a first portion of the working fluid received in the inlet of the suction manifold flows to the first arm of the suction manifold, and wherein a second portion of the working fluid received in the inlet of the suction manifold flows to the second arm of the suction manifold.

* * * * *